United States Patent
Donnelly et al.

[19]

[11] Patent Number: 5,892,512
[45] Date of Patent: Apr. 6, 1999

[54] SELECTION OF OPERATIONS IN A COMPUTER SYSTEM

[75] Inventors: Vanessa Donnelly, Coventry; Ray Trainer, Warwick, both of United Kingdom

[73] Assignee: International Business Machines Corporation, Armonk, N.Y.

[21] Appl. No.: 801,688

[22] Filed: Feb. 18, 1997

[30] Foreign Application Priority Data

Jul. 6, 1996 [GB] United Kingdom ............ 9613767

[51] Int. Cl.[6] ............................................. G06F 3/00
[52] U.S. Cl. ................................. 345/349; 395/683
[58] Field of Search ........................ 345/333, 334, 345/339, 348, 349, 352, 353, 354; 395/683

[56] References Cited

U.S. PATENT DOCUMENTS

| | | | |
|---|---|---|---|
| 5,230,063 | 7/1993 | Hoeber et al. | 345/354 |
| 5,604,907 | 2/1997 | Conner et al. | 395/683 |
| 5,734,905 | 3/1998 | Oppenheim | 395/683 |

FOREIGN PATENT DOCUMENTS

| | | |
|---|---|---|
| 0445 769 A2 | 9/1991 | European Pat. Off. . |
| 0540 925 A1 | 5/1993 | European Pat. Off. . |
| 0628 904 A2 | 12/1994 | European Pat. Off. . |
| WO 92/12488 | 7/1992 | WIPO . |
| WO 94/15273 | 7/1994 | WIPO . |

*Primary Examiner*—A. Katbab
*Attorney, Agent, or Firm*—David A. Mims, Jr.

[57] ABSTRACT

The present invention relates to a computer system having a user interface through which a user can select an action in order to invoke a desired operation, and to a method of operation of such a computer system. The action is selectable by one or more views provided via the user interface, and the system comprises generation means for representing an action by an action object, the action object defining, for each available view that can be employed to represent that action, the attributes required to provide that view, and an identifier to identify the operation to be invoked upon selection of the action. Further the system comprises identifying means for identifying when a user selection of a view has occurred, and for informing the associated action object of that selection, and the action object is responsive to the identifying means to employ the unique identifier to generate a command to invoke the desired operation. In preferred embodiments, the computer system is connectable to a display device to display a graphical user interface, and at least one of the views that can be employed to represent the action is a visual view displayable via the graphical user interface, the attributes defined in the action object for said at least one of the views including data required to produce the visual view. The computer system achieves single event generation from multiple views, and therefore the application does not need to concern itself with how the user generated the call. The action views query the attributes of the action object directly, all the necessary data is held in one place, and with automatic view concurrency, the application developer no longer has to worry about keeping action views synchronised with each other.

13 Claims, 7 Drawing Sheets

SELECTION OF OPERATIONS IN A COMPUTER SYSTEM

FIELD OF THE INVENTION

The present invention relates generally to computer systems having user interfaces through which a user can select operations to be performed by the computer system, and in particular to the mechanisms used to enable the user to invoke such operations.

BACKGROUND INFORMATION

User interfaces allow the computer user to interact or communicate with the computer system. User interfaces are typically implemented with a display screen and a user-controlled entry device, such as a keyboard, mouse, microphone, light pen or the like. The display screen displays information and data to the user and the user uses the entry device to give commands and provide information to the computer system.

During recent years, more and more people have wanted and needed to use the power of the computer in their daily work. However, generally these users do not want to be required to know specific commands, operators, syntax rules, etc, and much work has been expended on developing user interfaces which alleviate the need for such levels of knowledge. The most common form of user interface nowadays is the so-called graphical user interface (or GUI). Typically, a GUI presents the user with windows and icons. Windows typically include a menu bar, a tool bar, and a client area. The client area may typically include a number of icons, which are small stylized representation of entities (applications, folders, etc) with which the user works.

To enable the user to invoke particular operations on the computer system, the user interface needs to provide selection mechanisms to the user. In a typical user interface environment, this may be achieved by defining 'actions' which the user can select via 'views' of those actions provided via the user interface. For the purposes of this application, an action can be defined as a user initiated event which invokes an operation. The 'views' used to represent an action within the user interface may take a number of different forms, both visual and non-visual.

Figure 5A:
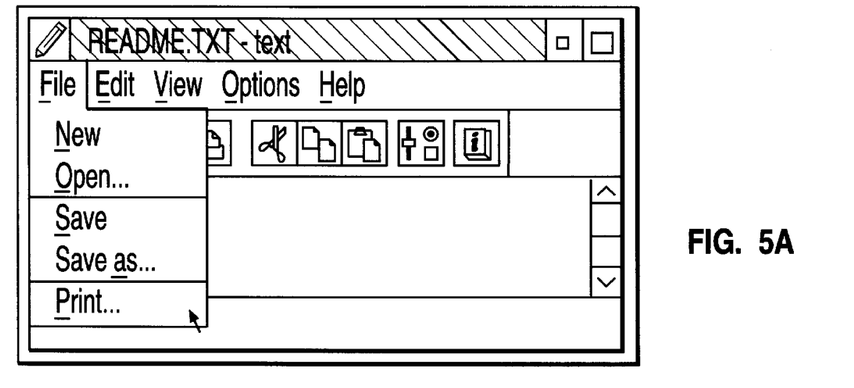
FIGS. 5A to 5F illustrate various examples of visual views used to represent actions.
Figure 5B:
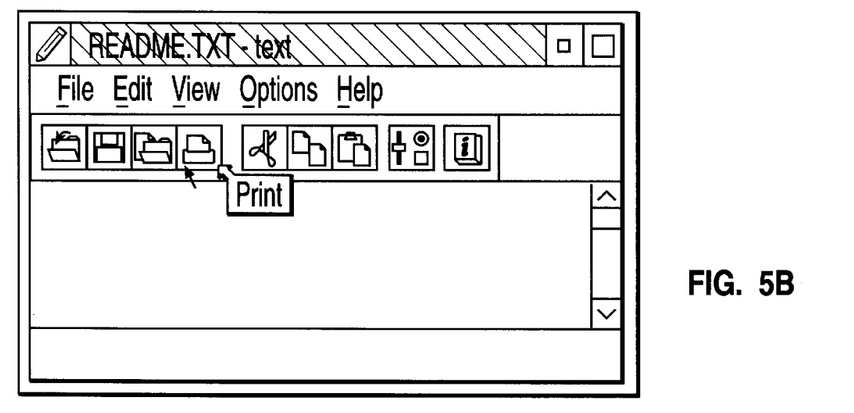
Figure 5C:
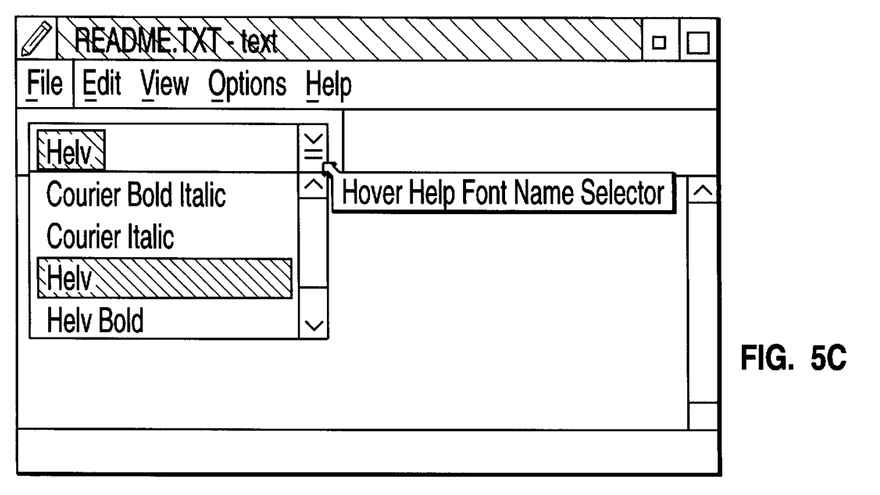
Figure 5D:
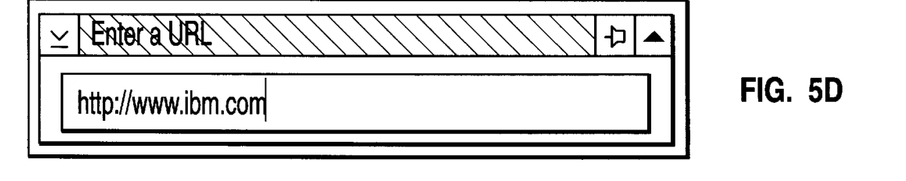
Figure 5E:
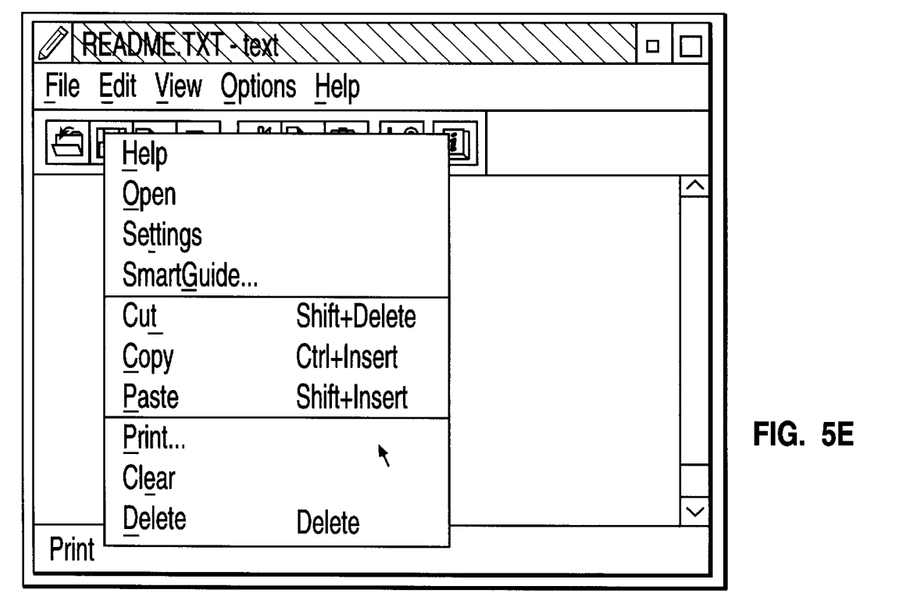
Figure 5F:
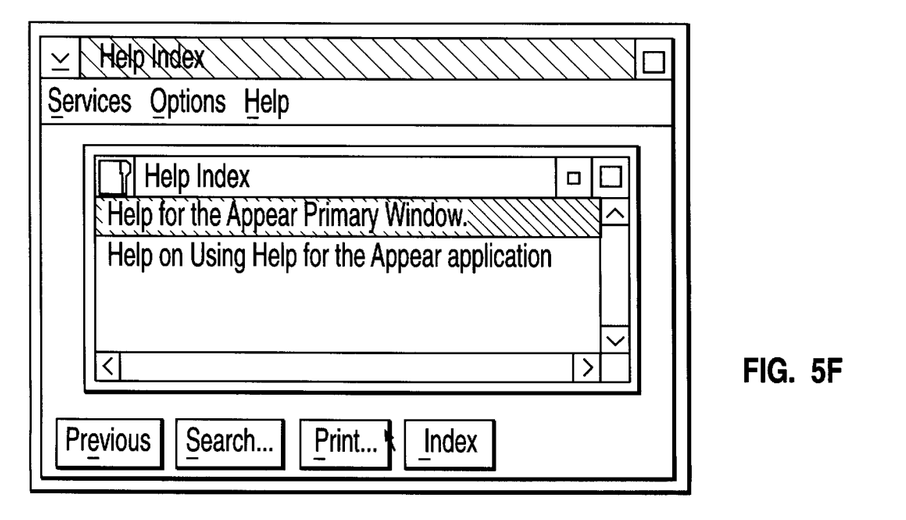

Typical examples of visual views used in GUIs would be a word or phrase on a menu bar (as illustrated in FIG. 5A where the 'Print' action is selected from a word view), a graphical representation such as an icon or bitmap on a tool bar (as illustrated in FIG. 5B where the 'Print' action is selected from a print bitmap view), or other visual controls that enable user selection or input. Examples of such other controls are a combination box control that allows font selection (as illustrated in FIG. 5C), or an entry field that allows the setting of a string property such as setting the name of a directory or setting a tool bar name (as illustrated in FIG. 5D). These controls could appear anywhere within the user interface including a tool bar or a window layout. Further examples of visual views are illustrated in FIG. 5E, where the print action is selectable from a context menu displayed by depressing the right mouse button whilst positioned over the window area, and in FIG. 5F where the print action is selectable from a push button view in a window layout.

Examples of non-visual views would be accelerator data such as 'Ctrl+P' used to select a print action, speech pattern data used to determine whether a speech input has selected the action, or gesture data to determine whether an input gesture (such as a stroke of a pen on a tablet) is a selection of a particular action. For the purposes of the present application, all such mechanisms for selecting actions (whether visual or non-visual) will be referred to as 'views'.

Currently, when developing applications, a significant amount of developer effort is required to provide the functionality required to enable the user to select actions. Additionally, there is a problem in achieving user interface and functional consistency between applications that display views of actions which are functionally perceived by the user as being the same.

One reason why enablement of these actions is so time consuming to the developer is that there are a number of different places within an application where the user can select the same action, since there may be many views of a particular action available for selection by the user in different places within the user interface. Obvious views on actions are those found within menu bars, tool bars and context menus. However, there are also, for example, many places within an application where the user is presented with a push button that opens a dialog or window. This 'action' could quite easily be available from a menu bar or context menu in other circumstances.

Some actions open dialogs, like the file open dialog, and some actions do not, but still perform an operation, like the cut, copy and paste actions. The thing that binds these operations together is the fact that they are made available to the user from views of actions. An example of this is where a user can select a print option from a menu bar pull down, a tool bar button on a tool bar, an entry on a context menu, or for example a push button on a dialog. Essentially the same operation of opening a print dialog occurs, but the visual selection mechanisms are different to achieve the same result.

A second consideration which increases the amount of effort required by the developer is that there are a number of different input mechanisms that can be employed by the user to select the same action. The standard point and click mechanism of the mouse is well understood, and this would be the typical mechanism used to select visual views displayed via the GUI. However, a number of actions also have accelerator options that allow selection via a specific character on the keyboard (eg 'P' for selecting the 'Print' action). Further, speech enabled applications allow the user to speak commands, so that for example the user can say 'Print' to open the print dialog, and if a pen gesture has been defined for opening a print dialog, pen enablement will add another view that may be available for the user to select the action.

Additionally, there are situations where small interface behaviors are so pervasive that the same piece of code is written repeatedly throughout an application. An example of this is when an application has a number of dialog type windows that allow the user to cancel out of the window without applying any changes. The visual representation of this function may, for example, be a 'Cancel' push button, but usually there is also a keyboard mechanism to achieve the same result, for example selection of the 'Esc' key. Traditionally the developer would have to code three things to achieve this function, namely: a) to provide a push button on a dialog; b) to add the escape accelerator to the accelerator table; and c) to provide the cancel procedure within the application code. These three stages would normally be repeated every time the escape function is needed for an individual window.

The application developer thus currently has to write a significant amount of code to cope with these different scenarios, and when new technology is introduced, e.g.

speech, additional work is needed by the developer to make that new selection mechanism available to the user. Since there are a number of permutations for the developer to remember, there are times when certain selection mechanisms are not enabled within products. This leads to usability problems across products, where one application works one way, and another does not. Added to this, the various views on the same actions usually are constructed in a number of different ways, and once constructed have little to no user customisation capabilities.

From the above, it will be apparent that there is currently a lot of work for the developer to do in order to fully support the various views of actions, both visual and non-visual, that are required. It is an object of the present invention to provide a system and method which alleviates the above identified problems.

SUMMARY OF THE INVENTION

Viewed from a first aspect the present invention provides a computer system having a user interface through which a user can select an action in order to invoke a desired operation, the action being selectable by one or more views provided via the user interface, the system being characterised by: means for providing an action object to represent an action, the action object defining, for each of said one or more views that can be employed to represent that action, the attributes required to provide that view, and an identifier to identify the operation to be invoked upon selection of the action; identifying means for identifying when a user selection of a view has occurred, and for informing the associated action object of that selection; the action object being responsive to the identifying means to employ the identifier to generate a command to invoke the desired operation.

In preferred embodiments, the computer system is connectable to a display device to display a graphical user interface, and at least one of the views that can be employed to represent the action is a visual view displayable via the graphical user interface, the attributes defined in the action object for said at least one of the views including data required to produce the visual view.

Viewed from a second aspect, the present invention provides a method of operating a computer system having a user interface through which a user can select an action in order to invoke a desired operation, the action being selectable by one or more views provided via the user interface, the method being characterised by the steps of: (a) providing an action object to represent an action, the action object defining, for each of said one or more views that can be employed to represent that action, the attributes required to provide that view, and an identifier to identify the operation to be invoked upon selection of the action, said action object being responsive to such selection to employ said identifier to invoke the desired operation; (b) identifying when a user selection of a view has occurred; and (c) responsive to an identification of a user selection of a view, informing the associated action object of that selection, thereby to invoke the desired operation.

Viewed from a third aspect the present invention provides a program product for use with a computer system having a user interface through which a user can select an action in order to invoke a desired operation, the action being selectable by one or more views provided via the user interface, the computer system further having a processor for running an application, and a memory for storing data used by the application, the program product being arranged to provide the following functions when loaded in to the memory of the computer system: means for providing an action object to represent an action, the action object defining, for each of said one or more views that can be employed to represent that action, the attributes required to provide that view, and an identifier to identify the operation to be invoked upon selection of the action; identifying means for identifying when a user selection of a view has occurred, and for informing the associated action object of that selection; the action object being responsive to the identifying means to employ the identifier to generate a command to invoke the desired operation.

Viewed from a fourth aspect, the present invention provides a program product for use on a computer system to develop an application, the application being intended for use on a system having a user interface through which a user can select an action in order to invoke a desired operation, the action being selectable by one or more views provided via the user interface, the program product being arranged to provide the following functions when loaded on the computer system used to develop the application: generation means for generating an action object to represent an action, the action object defining, for each of said one or more views that can be employed to represent that action, the attributes required to provide that view, and an identifier to identify the operation to be invoked upon selection of the action, the action object being responsive to such selection to employ the identifier to invoke the desired operation.

According to the invention, a single mechanism is provided for dealing with actions. This mechanism takes the form of an OOP object which defines, for each available view that can be employed to represent that action, the attributes required to provide that view, and an identifier to identify the operation to be invoked upon selection of the action.

Object Oriented Programming (OOP) is a particular approach to software development which implements required functions by way of 'messages' sent to 'objects'. An 'object' is a software package that contains a collection of data and related software procedures (often called 'methods'). Typically, objects are created as instances of a particular 'Object Class', the class being a template for defining the procedures and data for a particular type of object. A 'message' is a signal sent to an object to request that object to carry out one of its procedures. Hence a message sent to an object will cause a procedure to be invoked to implement the required function.

For the purposes of the present application, the OOP object provided for dealing with actions shall be referred to as an 'action object'. In preferred embodiments, this action object defines, for each available user selection mechanism (or 'view') that can be employed to represent that action, a) the attributes required either to construct a visual representation of the action for visual user selection or to construct other representations that enable selection through non-visual mechanisms, and b) an identifier to identify the operation to be invoked upon selection of the action. Preferably this identifier consists of a unique identifier for the action object selected, and an application call back mechanism that is automatically invoked when the action is selected in order to cause the desired operation to take place. By such an approach, an application can define a single entry point to be defined when an action is selected without having to be aware of which input mechanism generated the call (eg mouse, keyboard, speech input, etc) or from which view the action was selected.

Additionally, in preferred embodiments, the action object defines the current state of the action, such as whether it is enabled, disabled, latched or undefined. The state of an action describes its visible state on associated visual action views and whether the action is selectable from non-visual views. The enabled state indicates that the action is currently available but not selected. The latched state indicates that the action is latchable and therefore can apply to further interactions within an application without explicitly being selected again. An example of this is the 'Bold' action within a word processor. If this action is latched, further data entry by the user will result in the Bold attribute being added to the new text. A disabled state indicates that the action is currently unavailable. An undefined state indicates that the current user selection has an indeterminate meaning to the action. An example of this, again within a word processor, is when the user selects a number of sentences, each with different fonts. The 'Font Selection' action might normally offer visual feedback of the currently displayed font within a font selection view, but in this case the state of the action is undefined because the action cannot determine the correct feedback to give to the user.

By removing this functionality from the individual selection and input mechanism where it is typically provided in prior art systems, the single action object can take the responsibility of notifying all the views from which it is currently available of any change in state. This removes an amount of view concurrency logic from the application code. The operation of providing standard techniques for a notification framework between objects is generally known in the art. For example, within the IBM Visual Age C++ product, classes are provided that perform this function. Other classes can pick up this behaviour by using the standard OO technique of inheriting from Observer and Notifier classes.

In GUI environments the selection mechanisms for a set of actions are often grouped together in some way. Usually, sets of actions are visually represented as menu bars, tool bars and pop up menus. However, non visual representations can also be provided, such as accelerator tables which enable keyboard selection for a set of actions. For instance, a tool bar may include a number of graphical buttons, each of which is a view of a particular action, and selection of one of these buttons will cause the specific action that the button represents to invoke the required operation. For the purposes of the present application, such groupings of views shall be referred to herein as 'collective views', irrespective of whether such groupings are visual (eg menu bar, tool bar) or non-visual (eg accelerator table).

It should be noted that collective views may be nested within other collective views. For example a menu bar can be considered as a collective view, in that it includes views for a number of different actions. Some of the entries in the menu bar (eg the word "File") may themselves represent collective views, since once selected, another collective view may be displayed. For example, upon selection of the word "file", a collective view may be displayed taking the form of a list. Words in this list will be views of particular actions, eg 'Open' is a view of the 'open action' used to open a file.

In preferred embodiments of the present invention, a single mechanism for dealing with the construction of collective views is provided. This mechanism takes the form of an OOP object, referred to as a menu definition, which preferably contains: (a) a set of entries that individually represent either an action object, a separator or a reference to another instance of a menu definition; and (b) the attributes required to provide a representation for a collective view on actions (whether visual or non-visual).

Preferably, the menu definition also defines the context in which the collective view of actions will be displayed or be enabled for selection.

In preferred embodiments of the present invention, the system comprises construction means for constructing a collective view of actions from a menu definition defining the collective view, the menu definition having entries identifying action objects and/or other menu definitions to be represented by the collective view, and the construction means being arranged to reference these action objects and/or other menu definitions in order to construct the collective view.

Since the menu definitions reference action objects, and all the attributes required to construct a view of an action are contained within that action object, menu definitions can be used for more than one specific collective view. For example a particular menu definition can be used to construct a textual menu bar, or an equivalent graphical tool bar, since in both cases, the action object for a particular entry in the collective view is referenced, and the action object will be able to provide either the appropriate text (eg 'Print') or iconic form (eg a symbol representing a printer) dependent on what type of collective view is being constructed.

As mentioned earlier, a menu definition may, in preferred embodiments, include context information identifying under what circumstances collective views represented by the menu definition should be displayed or enabled. By default a menu definition, and thereby its associated 'collective view', is always enabled or displayed, however as an example, a pop up menu or context menu can have at least one context associated with it so that it is only displayed when its own context state is true.

Context may be applicable to any menu definition or collective view. For example, a menu bar may include embedded menu definitions that are always displayed, regardless of application context (eg. the 'File' pulldown menu, the 'Edit' pull-down menu, etc.), and some entries which are only applicable to certain contexts. For instance a menu bar may contain an embedded menu definition that provides a set of actions that manipulate graphical images. This set of actions may only be applicable when a graphical object is selected by the user, therefore when a graphical image is not selected, the menu bar would not display the embedded menu definition. The menu bar is able to make this decision by comparing the context of embedded menu definitions against the current application context.

In preferred embodiments, an action palette view (280) is provided which is displayable on the display device (55) to provide a list of available actions. This allows the user direct editing capability of attributes of an action. Further, the palette view is preferably drag-drop enabled which allows the user to readily add actions to visual collective views.

BRIEF DESCRIPTION OF THE DRAWINGS

The present invention will be described further, by way of example only, with reference to a preferred embodiment thereof as illustrated in the accompanying drawings, in which.

DESCRIPTION OF A PREFERRED EMBODIMENT

Figure 1:
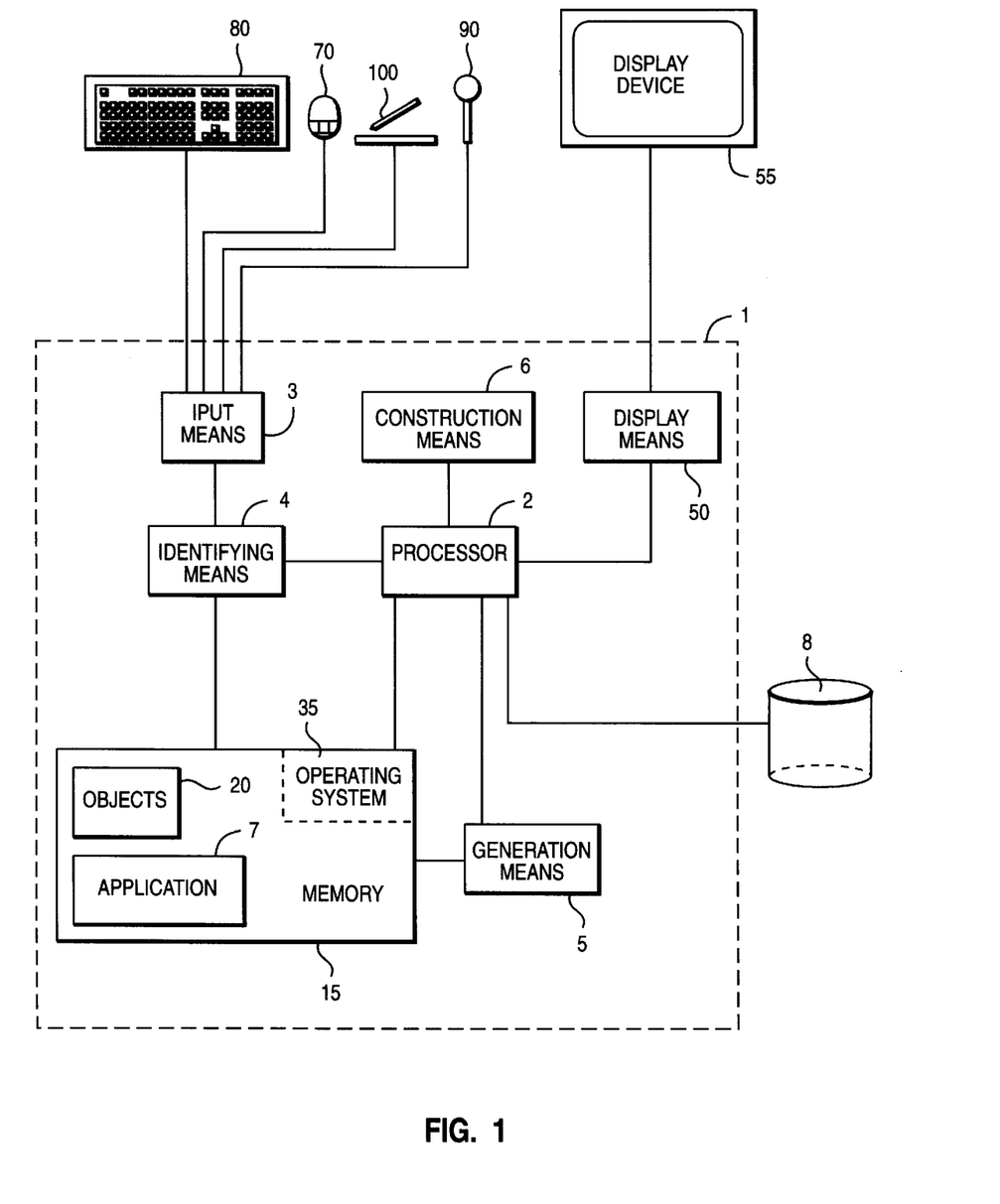
FIG. 1 is a block diagram illustrating a system in accordance with the preferred embodiment of the present invention.

The system of the preferred embodiment will be discussed with reference to FIG. 1, which is a block diagram showing the main functional elements of the system. FIG. 1 illustrates a typical computer system 1 having an operating system 35 installed thereon, a central processing unit 2, memory 15, a storage device 8 which may be incorporated as part of the system or accessed remotely, and a display device 55 connectable to the computer system.

The processor 2 is arranged to pass display data to the display means 50 for display on the display device 55. As will be appreciated by those skilled in the art, the operation of the display means is generally known in the art, and hence need not be discussed in any further detail herein. It suffices to say that it encompasses the various software and hardware components used to pass data to the display device 55. In the IBM OS/2 operating system, a layer of OS/2 call Presentation Manager is used for this purpose.

In the preferred embodiment of the invention, a standard GUI is displayed on the display device 55 presenting the user with a number of windows and icons. A software application 7 is associated with one or more of these windows in the GUI. To enable the user to interact with the application 7 so as to invoke particular operations, the GUI preferably provides visual views of certain actions which the user can select. In addition, certain non-visual views such as accelerator data within an accelerator table may enable the user to select keyboard characters to invoke actions and hence the corresponding operation.

The user will select the views via an appropriate input device connected to the computer system 1. Examples of such input devices are a mouse 70, a keyboard 80, a microphone 90, or a pen 100. As will be appreciated by those skilled in the art, for visual views such as buttons, menu bars and tool bars, the user would typically use the mouse 70. However, he/she may also choose to select actions via key entries on the keyboard 80 (eg accelerator keys), gesture entries via the pen, or voice entries via the microphone. However the input signal is generated, it will be received by the input means 3, and is then passed on to the identifying means 4 for analysis. As will be appreciated by those skilled in the art, the function of the input means 3 is typically provided by the operating system/GUI of the system, for example the mouse driver code in the case where the input device is a mouse. The identifying means 4 is preferably a software process executed under the control of processor 2 to identify whether the input signal corresponds to a selection of a particular view of an action. In the preferred embodiment, the manner in which this identification is performed is provided as part of an action framework, which will be discussed in more detail later with reference to FIGS. 2 to 4. However, it is not necessary to provide this function as part of the action framework, and instead, as will be appreciated by those skilled in the art, the identifying means 4 can be provided elsewhere.

Once the identifying means 4 identifies that a user selection of a view has occurred, the associated object 20 in memory 15 is notified. Then, under the control of the processor 2, the object invokes a specified operation defined within the object. For example, if the view corresponds to a print action object, then that print action object will define a printing operation to be invoked upon selection of the print action.

To enable objects to be created within the memory 15, a generation means 5 is provided. This allows the application developer to define objects to be used by the application 7. In the preferred embodiment, this function is provided as part of the action framework, which will be described more fully later with reference to FIGS. 2 and 3. However, an action framework is not essential. Instead, as will be appreciated by those skilled in the art, the developer can construct his/her own objects using standard OOP techniques. By defining classes of objects which provide the standard view attributes and procedures relevant to objects of that class, the developer can then readily create multiple instances directly from those classes.

The system of the preferred embodiment further comprises a construction means 6 which, under the control of the processor 2, is used to create collective views from menu definition objects 20 stored within the memory 15. Menu definition objects, like action objects, are created by the generation means 5, and the construction means 6 is then used to produce collective views such as tool bars, menu bars, and accelerator tables from those views. In preferred embodiments, the construction means 6 is also part of the action framework, but it will be apparent to those skilled in the art that this function can be provided elsewhere. All that is required is to provide some function to construct the collective view from the definitions in the menu definition object. The process for constructing collective views will be described in more detail later with reference to FIG. 3.

Figure 2:
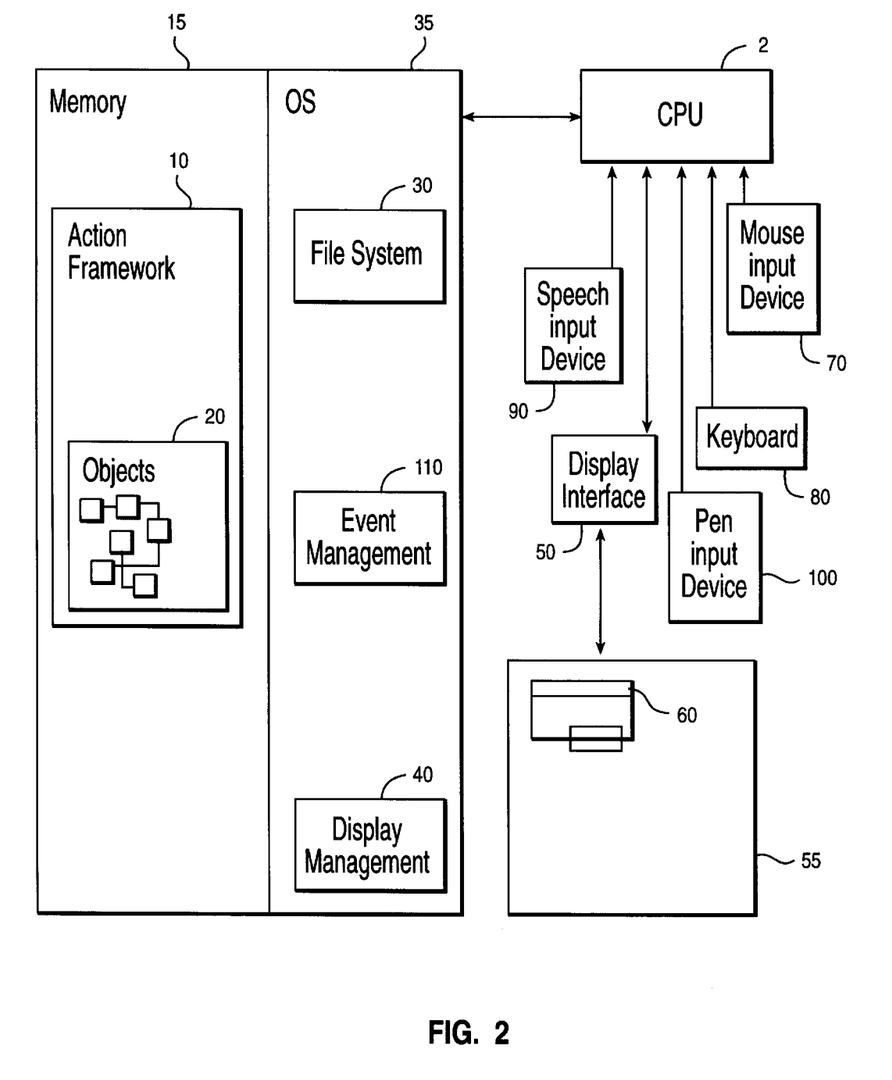
FIG. 2 is a schematic diagram further illustrating a system in accordance with the preferred embodiment of the present invention.

The system of the preferred embodiment will now be discussed in more detail with reference to FIG. 2, which is a block diagram showing the main functional elements of the system. As mentioned earlier, in the preferred embodiment, the system is provided with an Action Framework 10 that comprises a set of base objects 20 that can be logically 'wired' together with application code for performing a task. The action framework 10 uses the underlying file system 30 of the operating system to load from system storage and store in memory 35 the view attributes that are associated with the views of objects that exist within the framework 10.

Once the menu definitions and action objects required by a particular application have been constructed, the display management system 40 of the operating system (provided by 'Presentation Manager' in IBM's OS/2 operating system) is used to create the necessary signals for the display interface 50 to display the views of those objects on the display device 55. Typically, these views would be displayed in a GUI windowing interface 60. However, with the introduction of new input and output mechanisms such as speech, it will be appreciated that other output devices such as speech output devices could be used in addition to, or instead of, the display device 55.

Via the GUI interface 60, the user can interact with the system in order to select choices. Selection can be achieved by the user in more than one way, including a standard pointer device such as a mouse 70, a keyboard 80, a speech input device 90, a pen input device 100 or through a touch screen. Whichever way the user makes a selection, the various device drivers will create an event that is handled by the Event Management system 110 of the operating system.

Within IBM's OS/2 operating system, the event management function is handled by the operating system and Presentation Manager by provision of a standard control and windowing massaging system.

As will be discussed in more detail later, the selection event can be mapped to one of the objects 20 within the action framework 10, and this will cause a routine to be invoked that will perform the requested task irrespective of how or where the selection event is generated.

Figure 3A:
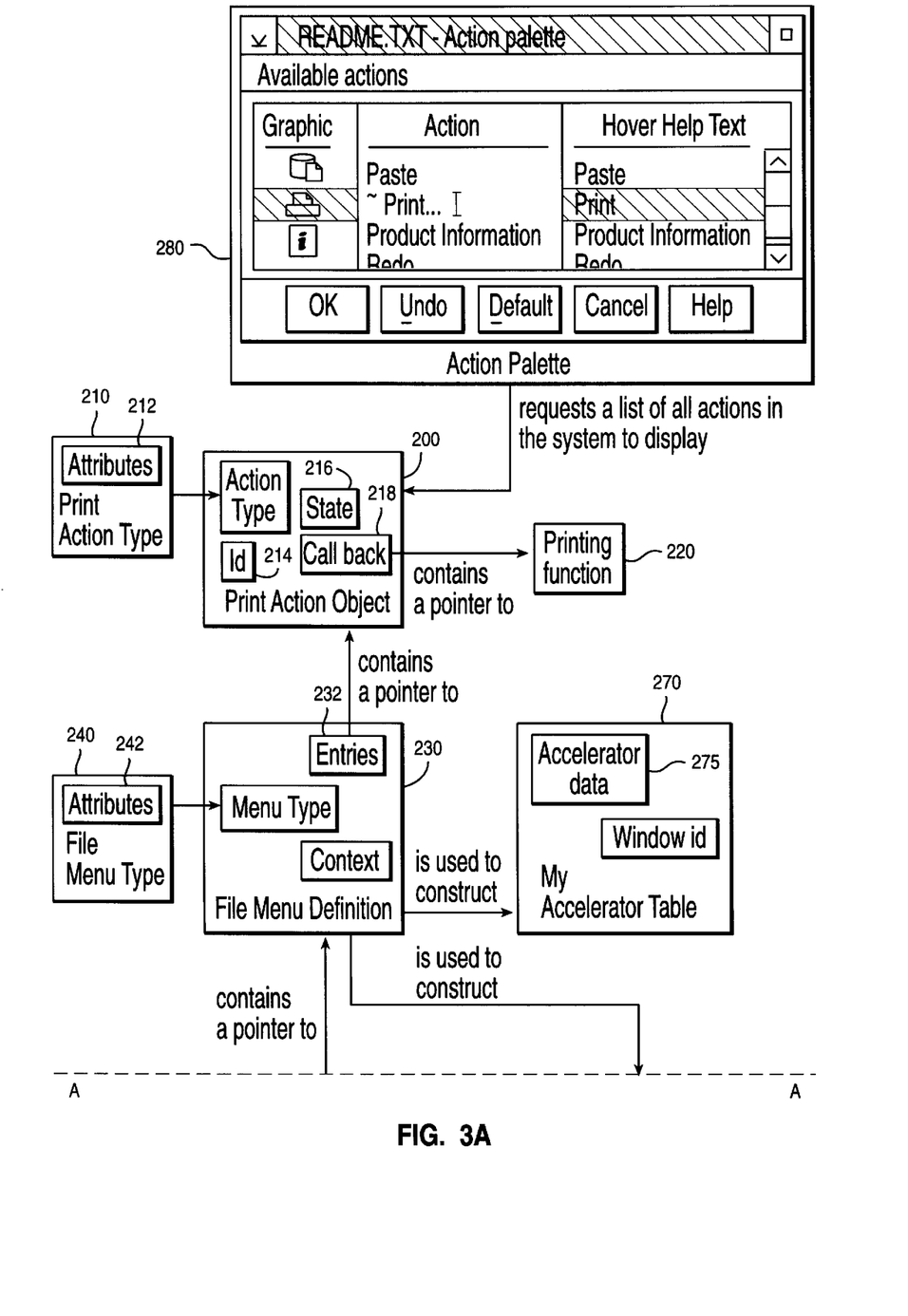
FIG. 3 is an object diagram illustrating the objects and relationships required to create collective views using action objects and menu definitions in accordance with the preferred embodiment of the present invention.
Figure 3B:
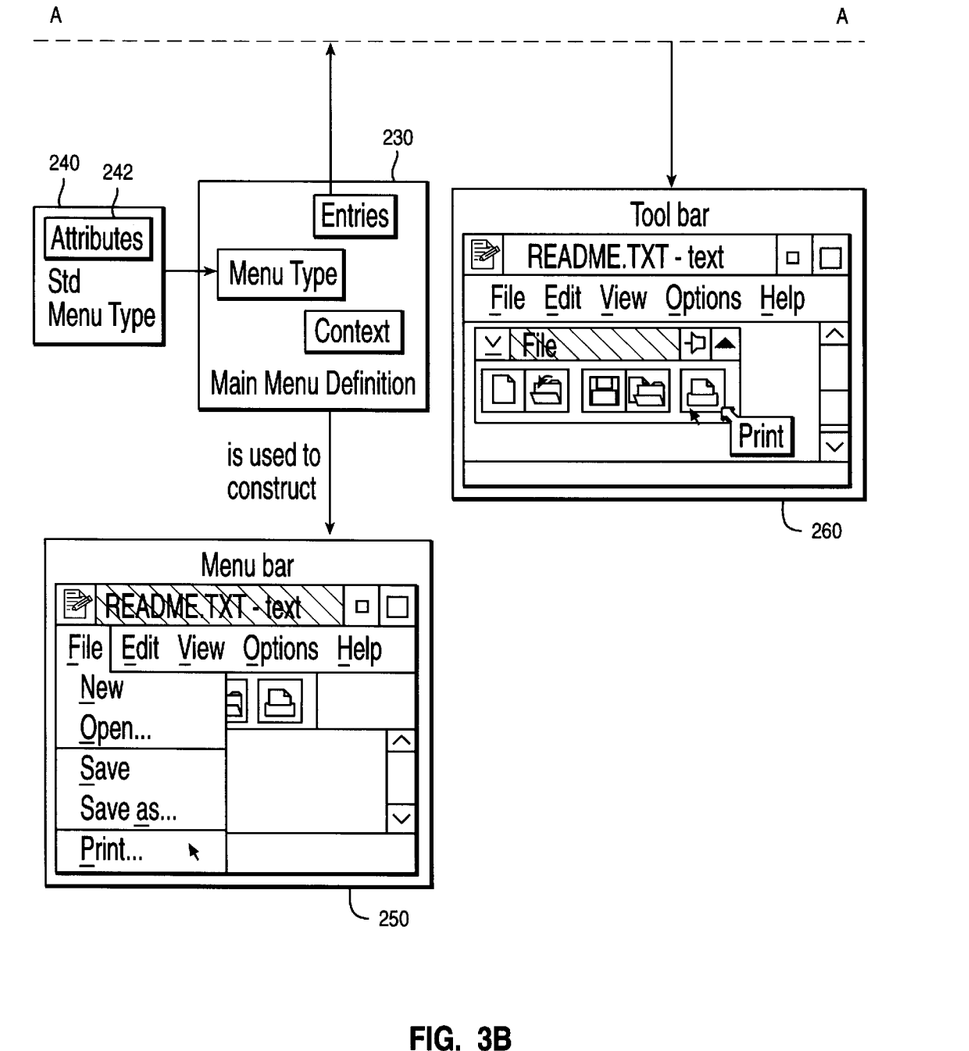

The base objects within the Action Framework 10 will now be discussed with reference to FIG. 3, which is an object diagram illustrating how, in accordance with the preferred embodiment of the present invention, objects are constructed to allow multiple views, and further how collective views can be created through relationships between objects.

Within the preferred embodiment, a base action object 200 is created which contains all the view attributes that are associated with a specified action. In the preferred embodiment, the action framework 10 provides an application extendable predefined set of view attributes 212 for common action types 210 that are stored within the underlying file system 30. This single set of action types are accessible by more than one object or application within the system, and therefore customisation of action type data will affect any object or application that uses these common action types.

Common action types include tasks like 'Cut', 'Copy', 'Paste' and 'Print', and for each action type there is stored all the view attributes that are needed to represent views of that action. Such view attributes would typically include the following information:

Menu Text and Button Text (eg. 'Print')

Graphic (eg. Print bitmap or icon)

Accelerator data (eg. 'Ctrl+P')

Mnemonic (eg. 'P' which is used for Menu navigation)

Hover help (eg. 'Prints the selected object')

Style attributes (whether the action is latchable or displayed to the user within an action palette (a list of available actions))

Category (what type of action it is eg. a File action)

Speech pattern (if defined)

Gesture (if defined)

Since action type attributes 212 are used to construct instances of an action object 200, this data can be viewed as being class wide for a particular action type. This means that there will only be one set of data for a 'Print' action type 210, even though an application might have a number of print action objects 200 which, for example, represent printing to different printers.

In addition to action type attributes, the action object 200 itself contains data that is pertinent to a specific instance of an action. For instance, each action object will have:

a unique identifier 214 (used for event routing from a user selection)

a current state 216 (whether the action instance is available, latched, unavailable, or has an undefined state)

a call back function 218 (which identifies the application defined code that will be called as a result of selection of the action)

In the preferred embodiment, the developer that wishes to generate a common action such as a 'Print' action, need only create the printing operation 220, and provide a pointer 218 to this operation to the action object. The printing operation will then be invoked when the action is selected. The printing operation can be provided at an action type level 220, such that if there is more than one print action object within the system, they will all call the same printing function 220 when selected. Alternatively, the print function can be specified at an instance level, in which case there will exist a different call back function for each print action instance.

Action type attributes 212 are set and queried through the action object 200. Therefore the action object supports certain 'methods' to provide the capability to perform particular functions, for example:

Set and query the attributes of the action object.

Hold the current state of the action, i.e.whether the action is highlighted, available or latched.

Notify any 'observers' when any attributes are changed if all the view attributes are held and updated in the same place, then when attributes or the state of an action changes, the action object can notify any views that are currently displaying it, so that they can refresh their display.

Allow for different types of view definitions to be held for the action, i.e. a tool bar view, a layout view.

Provide a unique event identifier to be generated, so that all the selection mechanisms and input mechanisms for the action create one event back to the application irrespective or how the user generated the call.

Save and restore the action attributes

From the above description, it will be apparent that by providing such an object, common actions can be created that hold all the commonly defined visual and non-visual view attributes. Since the action object does not handle the actual operation that is performed by a selected action, an application can easily pick up the view selection mechanisms, and the actual operation applicable to the application domain can then be defined by the application.

The above approach alleviates the amount of work that is needed on the developer's part to enable user selectable actions. Additionally, it solves most of the problems to do with inconsistencies of interface and functionality of common actions between different applications, since it removes a large amount of work that would normally be needed to keep view concurrency between different views on actions, as all this will be taken care of between the action object and the action views. If there are any views of an action defined at the application level, then these can be registered as an observer of the action object, which enables the view to be notified when an action's attributes or state changes. It is then up to the application defined view to change its representation if required.

The above description has discussed how the action objects are constructed, and how this enables consistent views of such objects to be readily created. The manner in which the system of the preferred embodiment handles collective views will now be discussed. In order to enable collective views to be created, whilst maintaining interface consistency and selection consistency, a tree like structure is created that contains groups of action instances. A menu definition object 230 is constructed which achieves this structure by holding a flat set of menu entries 232, which can either represent an action instance like the Print action object 200, a separator that is used to distinguish grouping within a visual display, or another menu definition instance, which in itself contains another flat set of menu entries. A tree like structure is thus achieved by embedding menu definition instances within other menu definition instances.

Within the preferred embodiment, a base Menu Definition object 230 is created which contains all the view attributes that are associated with a specified menu definition. Preferably, the Action Framework 10 provides a predefined set of view attributes 242 for common Menu Definition types 240 that are stored within the underlying file system 30. Unlike the standard action type definitions 210, menu type definitions 240 are not customisable by objects or applications as content and ordering within menus is related to single applications rather than across multiple applications. Therefore the menu definition object provides the customisation function of menus and also provides the load and store functionality required to load and restore individual menu content and ordering.

Common Menu types would typically include a Standard Menu, File Menu, Edit Menu and Help Menu. For each menu type there exists all the view attributes that are needed to build collective views. This data would typically include the following information:

Menu Text (eg. 'File')

Graphic (eg. File bitmap or icon)

Mnemonic (eg. 'F' which is used for Menu navigation)

Hover help (eg. 'This is the set of actions that can manipulate files')

Context (eg. 'Always'. In other words always display this menu independent of application or object context)

Entries (eg. NEW action type, OPEN action type, SEPARATOR, SAVE action type, SAVEAS action type, SEPARATOR, PRINT action type)

In the preferred embodiment, the developer that wishes to generate a common menu definition such as a 'File' menu definition need only ensure that the action types that are within the menu entry list of the File Menu type 240 have already been created and a call back function has been registered. If this is not the case, the action will not be included within the menu entry list within the menu definition instance. This has certain advantages in that common menu definitions can be used to create application menus without the application having to support all the actions within the set.

Menu Type attributes 242 are set and queried through the Menu Definition object 230. Therefore the Menu Definition object 230 supports certain methods, to provide the capability to perform certain functions, for example:

set and query the attributes of the menu definition object notify any 'observers' when any attributes are changed save and restore menu definition attributes By providing standard action and menu Types, user interface consistency is increased as is development productivity. However, it will be apparent to those skilled in the art that the concept of action objects and menu definitions can be implemented without using predefined action 210 and menu 240 types. For instance, by defining all the view attributes for a Print action within a single action object 200 directly (rather than by reference to a Print action type), this will still enable multiple views of the print action to be created and multiple selection mechanisms to be supported. Further, any number of menu definitions may still contain the same action object and any number of 'collective views' may be created from the same menu definition.

Once a menu definition instance 230 has been created, standard collective views can be created from a single menu definition. These views include a standard menu bar 250, a standard tool bar 260, a context menu or pop up menu, and an accelerator table 270 (the accelerator table 270 will be discussed in more detail during the description of FIG. 4).

Other standard collective views might include a speech table and a gesture table.

Customisation allows the user to change any of the visual attributes of the action, i.e. the menu text, the tool bar graphic, the hover help, etc. Further, in preferred embodiments, the Action Framework 10 provides an Action Palette view 280 which provides a list of all the available actions within the system that have a displayable attribute. This standard action palette view 280 is preferably drag-drop enabled, and allows the user to add actions to visual collective views. It also allows the user direct editing capability of attributes of an action. Through notification between this standard view 280 and the notification within the base action object 200, all collective views generated from a menu definition will automatically update with the new attributes as changes are made.

Customisation also allows the user to change visual attributes of menu definitions 230, like the menu text, the tool bar graphic and hover help. Since the menu definition is a dynamic hierarchical sequence of actions, the user can delete and add entries within visual collective views, or reorder them if required. Any customisation of menu attributes or content are automatically notified to any collective views on that object. This again alleviates the amount of work that is needed by a developer to provide view concurrency between views on menu definitions.

To cope with a user accidentally deleting actions that are actually needed, in preferred embodiments the full set of actions are always available from within the standard action palette view 280.

By employing the context attribute in a menu definition, menus can be defined that are only displayed to the user when a certain context state is true. Current context is associated with an application window or client area, and usually relates to user selection. By adding current context to the window or client area that a collective view is associated with (eg a menu bar is always attached to a window), the menu definition becomes an observer of this window or client area attribute. If its own internal context attribute does not match the current window or client area context, it can notify all views on itself to hide, and vice versa, if the context does match it can notify menus to display. This feature enables automatic context behaviour on any collective view.

Figure 4:
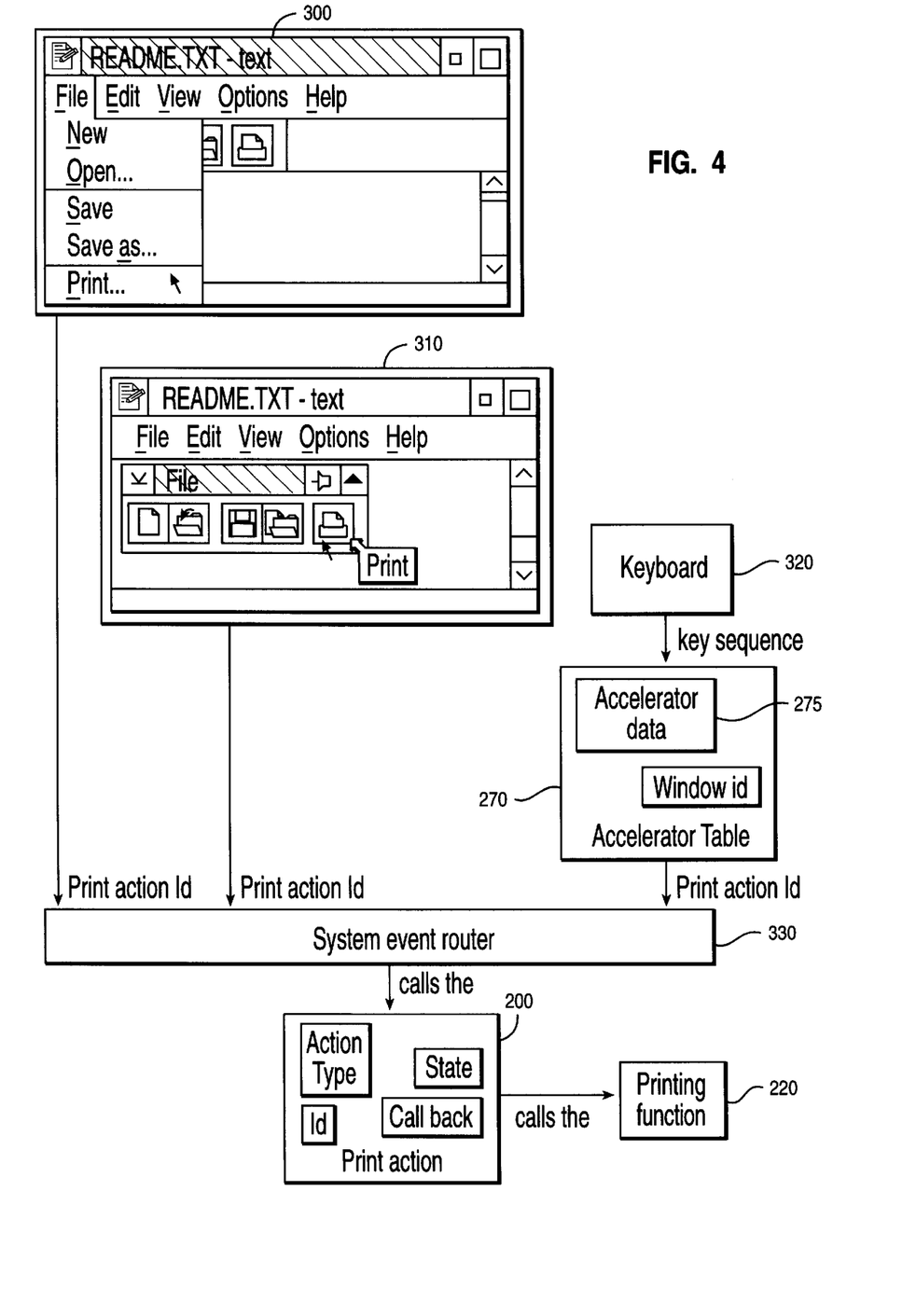
FIG. 4 is a diagram illustrating the flow of control when a user generates a selection within a collective view which results in the associated operation being called.

The flow of control for performing a task as a result of a user selection in accordance with the preferred embodiment of the present invention will now be described with reference to FIG. 4.

The user may have a number of input mechanisms available to select actions through a graphical user interface. FIG. 4 shows three separate ways to invoke a 'Print' action, namely a mouse selection on a menu bar entry 300, a mouse selection on a tool bar button 310 or a key combination of 'Ctrl+P' through the keyboard 320.

When the standard collective views of the menu bar and the tool bar are constructed from a menu definition instance, they iterate through the list of menu entries and create a window for each action instance that is within the list. The unique action identifier 214 is used for the window identifier for the associated menu entry or tool bar button that represents the action. Therefore, when the user selects either the tool bar button or menu entry, the event that is generated and routed through the System Event router 330 matches exactly to the action instance that needs to be called, since it includes the unique action identifier 214. The generation of an event is provided by the standard windowing massaging system within a GUI. The system event router 330 then represents the function provided by the identifying means 4 illustrated in FIG. 1.

When the standard collective view of the accelerator table 270 is constructed from a menu definition, it also iterates through the menu entry list for action instances. For each action instance in the list, the accelerator table object requests from the action instance its accelerator data and adds the returned key combination with the action unique identifier 214 to its internal look up table. The internal look up table is a list of accelerator data 275. Further a window ID is stored providing the relationship between the set of active keystrokes that enable actions through the keyboard and the active window within the GUI that these actions interact with. When a key combination is pressed by the user, the accelerator table checks against its lookup table to see if the key sequence has been registered against an action. If it has, it generates an event using the unique action identifier 214 which in turn is routed through the System Event router 330 and matches exactly to the action instance that needs to be called. Then, when the action 200 receives an event, it calls the registered call back function 220 to invoke the task.

From the above discussion, it will be apparent that the system of the preferred embodiment achieves single event generation from multiple views. Therefore the application does not need to concern itself with how the user generated the call. Using the mechanism of the preferred embodiment, the common action views query the attributes of the action object directly, all the necessary data is held in one place, and with automatic view concurrency, the application developer no longer has to worry about keeping action views synchronised with each other.

We claim:

1. A computer system having a user interface through which a user can select an action in order to invoke a desired operation, the action being selectable by a plurality of views provided via the user interface, the system being characterised by:

means for providing a single object-oriented action object to represent an action, the single object-oriented action object (200) defining, for each of said views that can be employed to represent that action, the attributes (212) required to provide that view, and an identifier (214, 218) to identify the operation (220) to be invoked upon selection of the action;

identifying means (4) for identifying when a user selection of a view has occurred from one of a plurality of selection mechanisms, and for informing the associated action object (200) of that selection;

the action object being responsive to the identifying means (4) to employ the identifier of said single object-oriented action object to generate a command to invoke the desired operation.

2. A computer system as claimed in claim 1, wherein the computer system is connectable to a display device (55) to display a graphical user interface, and at least one of the views that can be employed to represent the action is a visual view displayable via the graphical user interface, the attributes defined in the single object-oriented action object for said at least one of the views including data required to produce the visual view.

3. A system as claimed in claim 2, further comprising an action palette view (280) which is displayable on the display device (55) to provide a list of available actions for said single object-oriented action object.

4. A system as claimed in claim 1, further comprising construction means (6) for constructing a collective view of actions from a menu definition (230) defining the collective view, the menu definition having entries (232) identifying action objects and/or other menu definitions to be represented by the collective view, and the construction means (6) being arranged to reference these action objects and/or other menu definitions in order to construct the collective view.

5. A system as claimed in claim 4, wherein the menu definition further comprises context information defining when a collective view should be displayed or enabled for selection by a user.

6. A system as claimed in claim 1, wherein the identifier defined in the action object comprises a unique identifier (214) for the action object and a call back mechanism (218) to invoke the desired operation (220) upon selection of the action object.

7. A method of operating a computer system having a user interface through which a user can select an action in order to invoke a desired operation, the action being selectable by a plurality of views provided via the user interface, the method being characterised by the steps of (a) providing a single object-oriented action object (200) to represent an action, the action object defining, for each of said views that can be employed to represent that action, the attributes (212) required to provide that view, and an identifier (214, 218) to identify the operation (220) to be invoked upon selection of the action, said action object being responsive to such selection to employ said identifier to invoke the desired operation;

(b) identifying when a user selection of a view has occurred from one of a plurality of selection mechanisms, and (c) responsive to identification of a user selection of a view, informing the associated action object (200) of that selection, thereby to invoke the desired operation utilizing said single object-oriented action object.

8. A method as claimed in claim 7, wherein the computer system is connectable to a display device (55) to display a graphical user interface, and at least one of the views that can be employed to represent the action is a visual view displayable via the graphical user interface, the attributes defined in the single object-oriented action object for said at least one of the views including data required to produce the visual view.

9. A method as claimed in claim 8, further comprising the step of providing an action palette view (280) displayable on the display device (55) to provide a list of available actions for said single object-oriented action object.

10. A method as claimed in claim 7, further comprising the step of constructing a collective view of actions from a menu definition (230) defining the collective view, the menu definition having entries (232) identifying action objects and/or other menu definitions to be represented by the collective view, the step of constructing involving referencing these action objects and/or other menu definitions in order to construct the collective view.

11. A method as claimed in claim 10, wherein the menu definition further comprises context information defining when a collective view should be displayed or enabled for selection by a user.

12. A program product for use with a computer system having a user interface through which a user can select an action in order to invoke a desired operation, the action being selectable by a plurality of views provided via the user interface, the computer system further having a processor (2) for running an application (7), and a memory (15) for storing data used by the application (7), the program product being arranged to provide the following functions when loaded in to the memory (15) of the computer system:

means for providing a single object-oriented action object to represent an action, the action object (200) defining, for each of said views that can be employed to represent that action, the attributes (212) required to provide that view, and an identifier (214, 218) to identify the operation (220) to be invoked upon selection of the action;

identifying means (4) for identifying when a user selection of a view has occurred from one of a plurality of selection mechanisms, and for informing the associated action object (200) of that selection;

the action object being responsive to the identifying means (4) to employ the identifier of said single object-oriented action object to generate a command to invoke the desired operation.

13. A program product for use with a computer system to develop an application, the application being intended for use on a system having a user interface through which a user can select an action in order to invoke a desired operation, the action being selectable by one or more views provided via the user interface, the program product being arranged to provide the following functions when loaded on the computer system used to develop the application:

generation means (5) for generating a single object-oriented action object to represent an action, the action object (200) defining, for each of said one or more views that can be employed to represent that action, the attributes (212) required to provide that view, and an identifier (214, 218) to identify the operation (220) to be invoked upon selection of the action; that action object being responsive to such selection to employ the identifier of said single object-oriented action object to invoke the desired operation.

* * * * *